(12) United States Patent
McAllister

(10) Patent No.: US 9,221,373 B1
(45) Date of Patent: *Dec. 29, 2015

(54) BIOMECHANICAL PROTECTIVE SYSTEM

(71) Applicant: Wesley J. McAllister, Inman, SC (US)

(72) Inventor: Wesley J. McAllister, Inman, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,377

(22) Filed: Jul. 1, 2015

Related U.S. Application Data

(63) Continuation of application No. 11/635,134, filed on Dec. 7, 2006, now Pat. No. 9,078,477.

(51) Int. Cl.
*B60N 2/54* (2006.01)
*A41D 13/05* (2006.01)
*B60N 2/64* (2006.01)

(52) U.S. Cl.
CPC ............ *B60N 2/643* (2013.01); *A41D 13/0531* (2013.01); *B60N 2/646* (2013.01)

(58) Field of Classification Search
CPC ..... A41D 1/04; A41D 13/00; A41D 13/0015; A41D 13/0531; A61H 2205/081; A61H 2205/1623–2205/1626; A61F 5/01; A61F 5/024; A61F 5/026; A61F 5/028; A47C 7/40; A47C 7/425–7/467; A47C 16/005; A47C 17/161–17/162; A47C 17/165; A47C 20/027; B60N 2/028; B60N 2/64–2/66; B60N 2/7029
See application file for complete search history.

(56) References Cited

U.S. PATENT DOCUMENTS

| | | |
|---|---|---|
| 995,458 A | 6/1911 | Harriman |
| 4,680,813 A | 7/1987 | Glaeser |
| 4,746,044 A | 5/1988 | Arvizu et al. |
| 4,884,295 A | 12/1989 | Cox |
| 4,952,095 A | 8/1990 | Walters |
| 5,121,741 A | 6/1992 | Bremer et al. |
| 5,188,267 A | 2/1993 | Sargent et al. |
| 5,370,113 A | 12/1994 | Parsons |
| 5,522,679 A | 6/1996 | Eungard |
| 5,626,439 A | 5/1997 | Rowlands |
| 5,647,522 A | 7/1997 | Routh |
| 6,003,744 A | 12/1999 | Culjak |
| 6,035,452 A | 3/2000 | Braxton |
| 6,035,453 A | 3/2000 | Cain |
| 6,050,261 A | 4/2000 | Lewis et al. |
| 6,148,447 A | 11/2000 | Bain et al. |

(Continued)

OTHER PUBLICATIONS

Dirt Wheels Magazine, Jan. 2007, pp. 167-169.

(Continued)

*Primary Examiner* — Rachel Young
(74) *Attorney, Agent, or Firm* — Smith Moore Leatherwood LLP; Thomas W. Epting

(57) ABSTRACT

A system for biomechanically protecting a person carrying a structure on their back includes a body portion carried about the person's back and shoulders. A shoulder area pad is connected to the body portion and covers a portion of the person's shoulder area. A scapula area pad spaces the structure from the person's spine of the scapula area and covers a portion of the person's back adjacent the spine of the scapula. A paraspinal pad spaces the structure from the person's spinous processes and extends substantially the length of the person's spine, covering a portion of the person's para-spinal musculature. Protection from the structure is also provided by a lateral pad that covers a lateral portion of the person's back, a kidney pad that covers a portion of the person's back to protect the kidneys, and a sacrum pad that covers a portion of the person's sacrum area.

19 Claims, 17 Drawing Sheets

(56) References Cited

U.S. PATENT DOCUMENTS

| | | |
|---|---|---|
| 6,283,347 B1 | 9/2001 | Roh |
| 6,341,921 B1 | 1/2002 | Anderson et al. |
| 6,354,295 B1 | 3/2002 | Hasson, Jr. |
| 6,446,273 B1 | 9/2002 | Gillen et al. |
| 6,447,353 B1 | 9/2002 | Henry |
| 6,478,510 B1 | 11/2002 | Young |
| 6,925,652 B2 | 8/2005 | Feng |
| 2004/0077981 A1 | 4/2004 | Weaver et al. |
| 2004/0237177 A1 | 12/2004 | Grilliot et al. |
| 2005/0010987 A1 | 1/2005 | Crye et al. |
| 2006/0036304 A1 | 2/2006 | Cordani et al. |
| 2006/0175492 A1 | 8/2006 | Cooper |

OTHER PUBLICATIONS

Search Report and Written Opinion developed by ISA/US in regard to counterpart International Application No. PCT/US07/024789, dated Jun. 5, 2008.

http://en.wikipedia,org/wiki/Spine_of_scapula, dated Sep. 16, 2010.

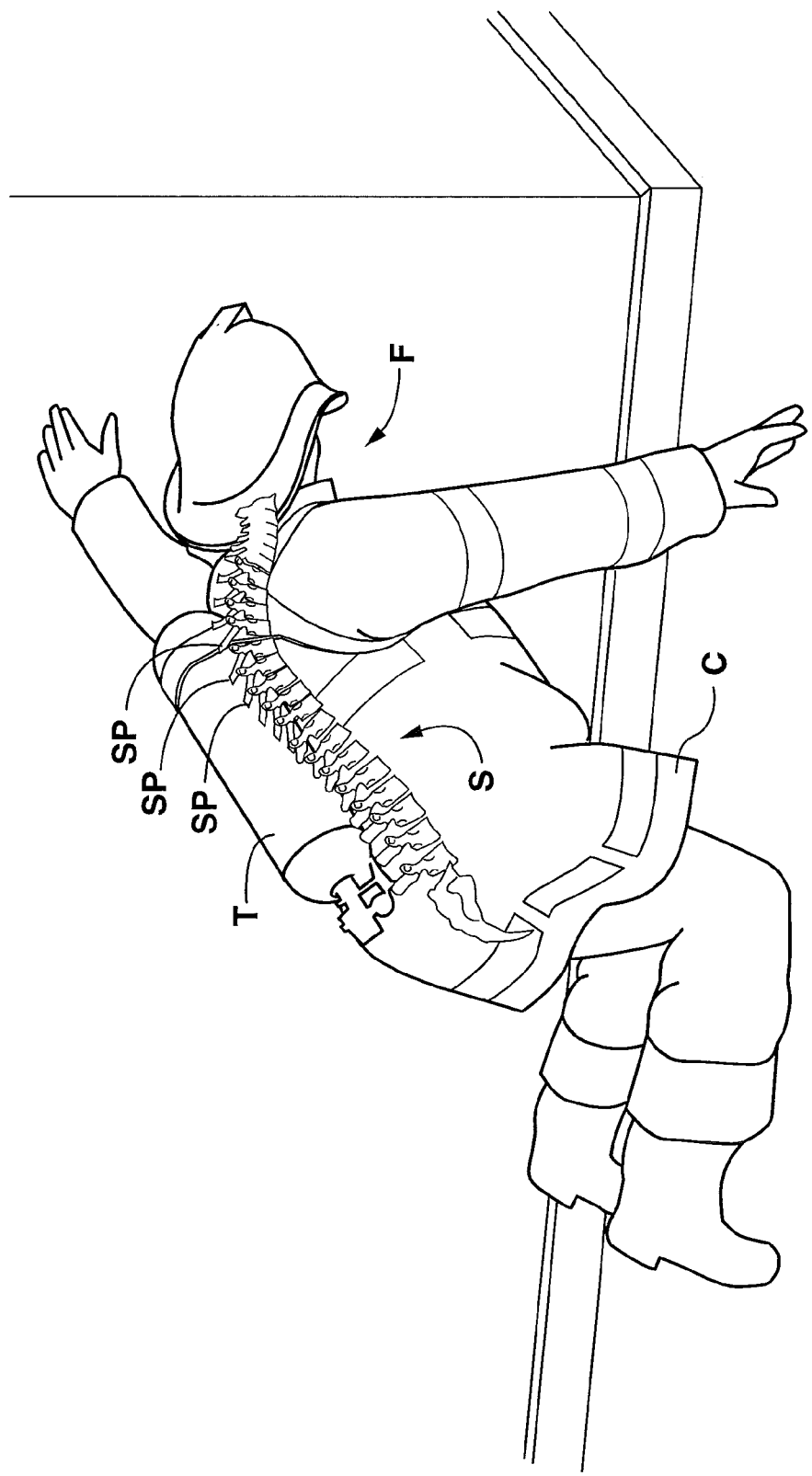

BIOMECHANICAL PROTECTIVE SYSTEM

This application is a continuation of application Ser. No. 11/635,134, filed Dec. 7, 2006, and the contents of the foregoing application is incorporated in its entirety by reference.

BACKGROUND OF THE INVENTION

This invention relates generally to a system for biomechanically protecting a person carrying a structure on their back and/or seated in a seat.

Carrying a load on one's back can, in certain circumstances, cause discomfort and/or injury. For example, firefighters may be required to carry self-contained breathing apparatus (SCBA) devices in certain situations. Wearing of an SCBA device can cause the SCBA device to potentially impinge on the wearer's bone and/or muscle tissue. In particular, impingement of the SCBA device can occur on the most rearward, or posterior, portions of the spine's vertebrae, known as the spinous processes. Further, wearing of an SCBA can cause it to impinge on a boney projection of the wearer's back, known as the spine of the scapula. Additionally, the SCBA device can impinge on less heavily muscled portions of the wearer's back, in contrast to the more densely layer para-spinal musculature located on either side of the wearer's spine, potentially causing bruising and/or rib breakage and/or fracture. Moreover, the SCBA device can impinge on the wearer's back near the kidney area and/or on the wearer's sacrum.

In addition to the potential problems associated with wearing an SCBA device, similar such problems may arise with other back-carried structures, such as child carriers, scuba tanks, backpacks, rucksacks, book sacks, equipment carriers, oxygen generators, etc. Also, similar impingement issues could arise with respect to forces being applied to a person's back in instances involving the person being seated in a seat experiencing vibration and/or acceleration forces, such as would be the case with jet aircraft seats, race car seats, speed boat seats, space vehicle seats, industrial equipment, amusement ride seats, automobile and truck seats, etc., and/or for ordinary seats such as office chairs, recliners, chairs found in the home, and the like.

SUMMARY OF THE INVENTION

Generally, the present invention includes a device for protecting a person, including a body portion that is carried about the person's back and shoulders, with a scapula area pad connected to the body portion. The scapula area pad is spaced from the person's spine of the scapula area and covers a portion of the person's back generally adjacent the spine of the scapula area. A para-spinal pad is also connected to the body portion and is laterally spaced from and extends substantially the length of the person's spine, covering a portion of the person's para-spinal musculature.

More specifically, one preferred embodiment of the present invention includes the body portion being vest-shaped, having a back portion, a first front portion, and a second front portion and an elongated first releasable fastener connected to the first front portion. An elongated second releasable fastener is connected to the second front portion and releasably fastens to the first releasable fastener. The second releasable fastener extends generally perpendicularly to the first releasable fastener. A shoulder area pad can be provided and connected to the body portion that generally covers a portion of the shoulder area of the person, as can also a lateral pad connected to the body portion that generally covers a lateral portion of the person's back. Additionally, a kidney pad and a sacrum pad can be included, the kidney pad generally covering a portion of the person's back adjacent to and/or generally over kidney area, and the sacrum pad covering a portion of the person's sacrum area.

In certain preferred embodiments, a load carrying portion, such as a child carrier, scuba tank, backpack, rucksack, book sack, equipment carrier, oxygen generator, etc. can be connected to the body section. Preferably, the scapula area pad generally spaces the rearwardmost extension of the person's spine of the scapula from the load carrying portion, and the para-spinal pad generally spaces the rearwardmost extension of the spinous processes of the person's spine from the load carrying portion.

The present invention also includes a seat configured for protecting a person, and includes a generally rigid support structure that supports the person, a scapula area pad connected to the support structure (the scapula area pad preferably being spaced from the person's spine of the scapula area and covering a portion of the person's back generally adjacent the spine of the scapula area), and a para-spinal pad connected to the support structure laterally spaced from and extending substantially the length of the person's spine and covering a portion of the para-spinal musculature of the person and to space the rearwardmost extension of the spinous processes of the person's spine from the support structure.

The present invention also comprises a method of protecting a person, which includes providing a body portion configured for being carried about the back and shoulders of the person and providing a scapula area pad connected to the body portion. Positioning of the scapula area pad is made to space the scapula area pad from the person's spine of the scapula area and to cover a portion of the person's back generally adjacent the spine of the scapula area with the scapula area pad. The method further includes providing a para-spinal pad connected to the body portion, the para-spinal pad having a first surface generally facing the person's back and a second surface generally facing away from the person's back, the para-spinal pad being configured to extend substantially the length of the person's spine, and laterally spacing the para-spinal pad from the person's spine such that the first surface of the para-spinal pad is proximate the para-spinal musculature of the person. Additionally, the para-spinal pad is positioned such that the second surface of the para-spinal pad projects rearwardly with respect to the person's back beyond the rearwardmost extension of spinous processes of the person's spine.

The biomechanical protective system of the present invention, in the context of a load carrying structure worn by a person, can provide protection to the wearer whether standing, bending or crawling. Upon flexion, or forward bending of the person's head and thorax, i.e., the upper body between the neck and the abdomen, the normal biomechanics of the spine S are such that the most rearward (posterior) portion of the vertebrae known as the spinous processes SP flare or more apart from each other. Sufficient impingement applied to this region of the spine during flexion can inhibit normal spinal biomechanics and induce abnormal and undesirable compensatory movement of the spinal vertebrae. Rotation and side (lateral) bending of the person can have a similar effect on the vertebral body rotation with proportional spinous process rotation. The biomechanical protective system of the present invention affords free space for movement and protection while providing recesses and/or gaps using padding to allow for and to accommodate necessary and/or or corresponding movement of the spine, vertebral bodies, and spinous processes. The vest of the present invention is preferably configured for a snug fit such that the facilitatory/protective gap is maintained over the center of the wearer's spinal column at all times.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which:

FIG. 5 is a perspective view of a firefighter wherein a biomechanical protective system constructed in accordance with the present invention in a bent over, twisted position;

DESCRIPTION OF THE PREFERRED EMBODIMENT

Figure 1A:
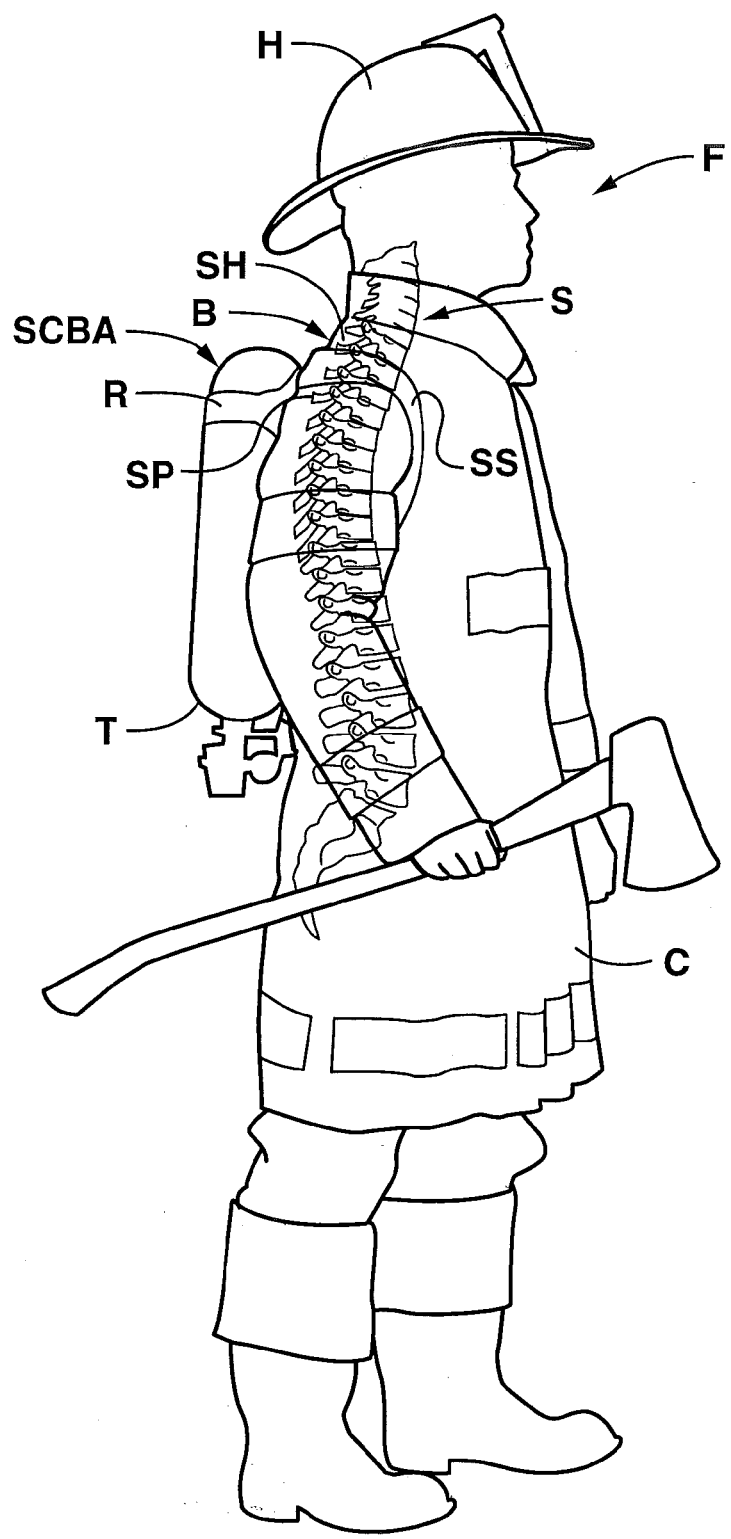
FIG. 1A is a perspective view of a firefighter and the orientation of the firefighter's spine when standing.

The foregoing, as well as other objects of the present invention, will be further apparent from the following detailed description of the preferred embodiment of the invention, when taken together with the accompanying drawings and the description which follows set forth this invention in its preferred embodiment. However, it is contemplated that persons generally familiar with personal protection equipment will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the biomechanical protective system of the present invention is indicated generally in the figures by reference character 10.

Figure 1B:
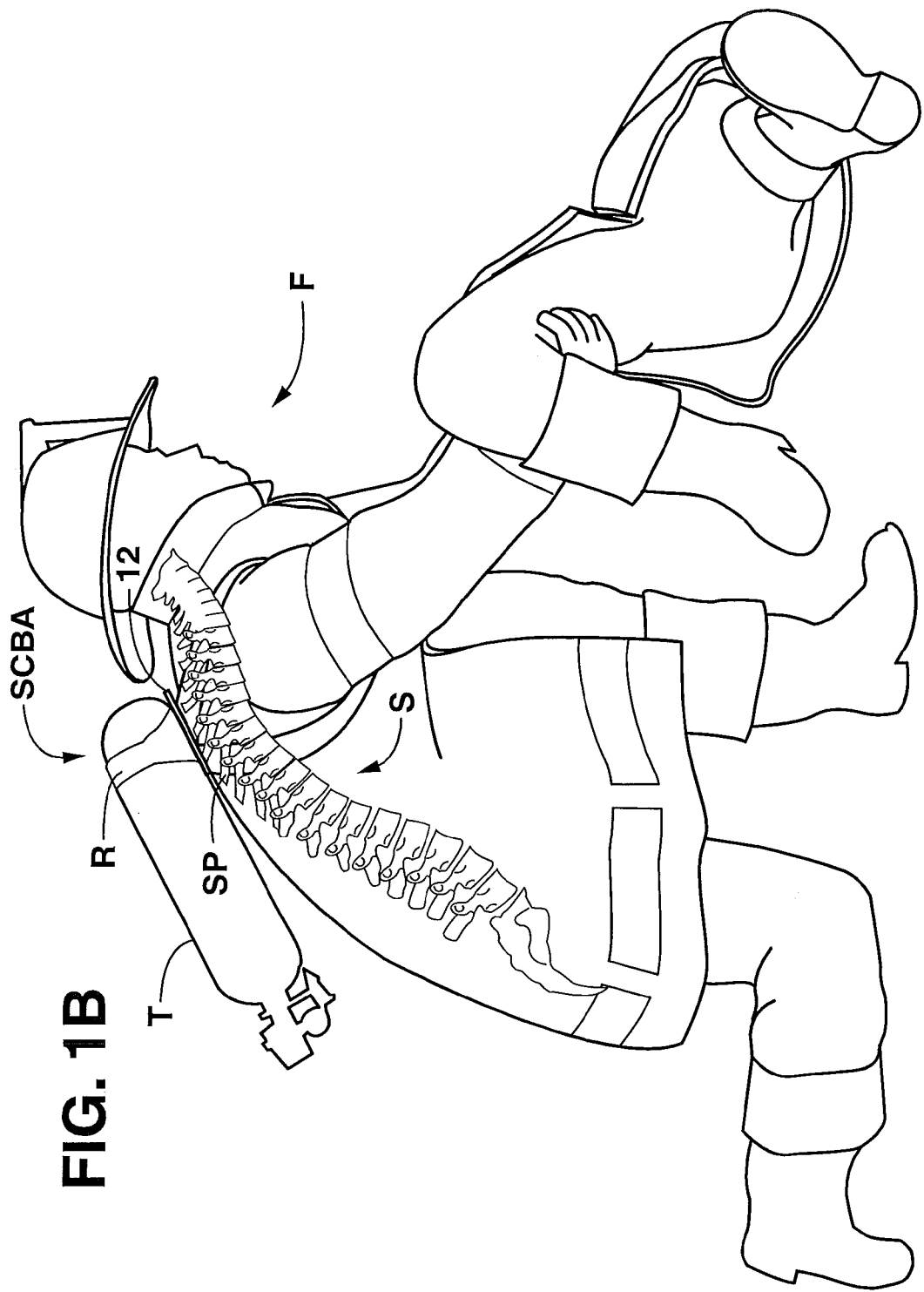
FIG. 1B is a perspective view of a firefighter illustrating the configuration of the firefighter's spine when bending over.

Turning to FIGS. 1A and 1B, a firefighter, generally F, wearing typical protective gear, such as a helmet, generally H, a flame retardant coat, generally C, and a self-contained breathing apparatus, generally SCBA, connected to a frame, generally R, having shoulder straps, generally SS, worn about the shoulders, generally SH, and back, generally B, of the firefighter. Typically, the SCBA extends generally vertically and is generally centered on the firefighter's back B during use.

The configuration of the firefighter's spine, generally S, includes vertebrae, generally V, having rearwardly extending spinous processes, generally SP. In FIG. 1B, spinous processes in the C-7 to T-5 range are shown, and some of which impinge upon one another and/or a frame portion, generally 12, of the SCBA, due to direct and or indirect contact, through the skin, with frame portion 12. It is believed this impingement of the spinous processes SP with the SCBA and/or its frame or supports, particularly brought about upon a firefighter F bending over (in flexion), can produce discomfort and/or undesirable health effects. Accordingly, reduction and/or elimination of such impingement is desirable.

Figure 1C:
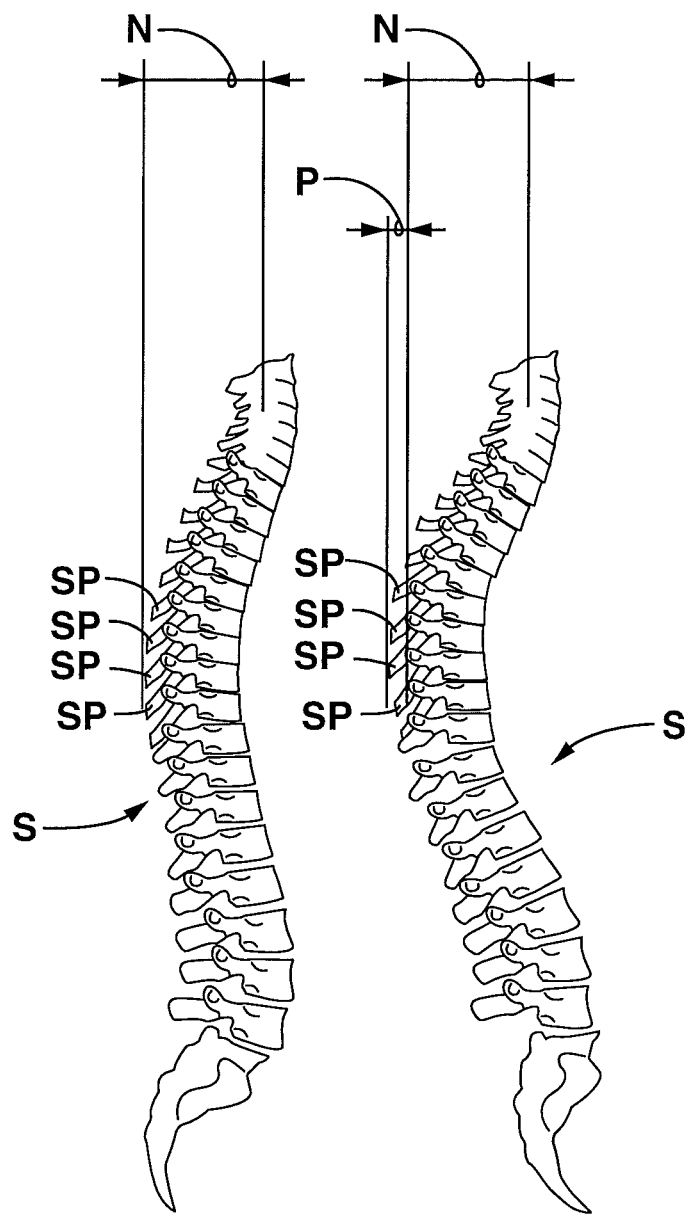
FIG. 1C is a perspective view of the configuration of a spine when a person is standing, and when a person is bending over.

FIG. 1C further illustrates the relative positions of the vertebrae V of a spine S, both when a person is standing, as shown in spine S on the left, and when a person is flexion (bending over), as shown in spine S on the right. Note the additional projection of spinous processes SP rearwardly, or posteriorly, when a person bends over. This amount of projection is illustrated by dimension P in FIG. 1C, with the normal projection of spinous processes being illustrated by dimension N in both of the spines S shown in FIG. 1C.

Figure 2A:
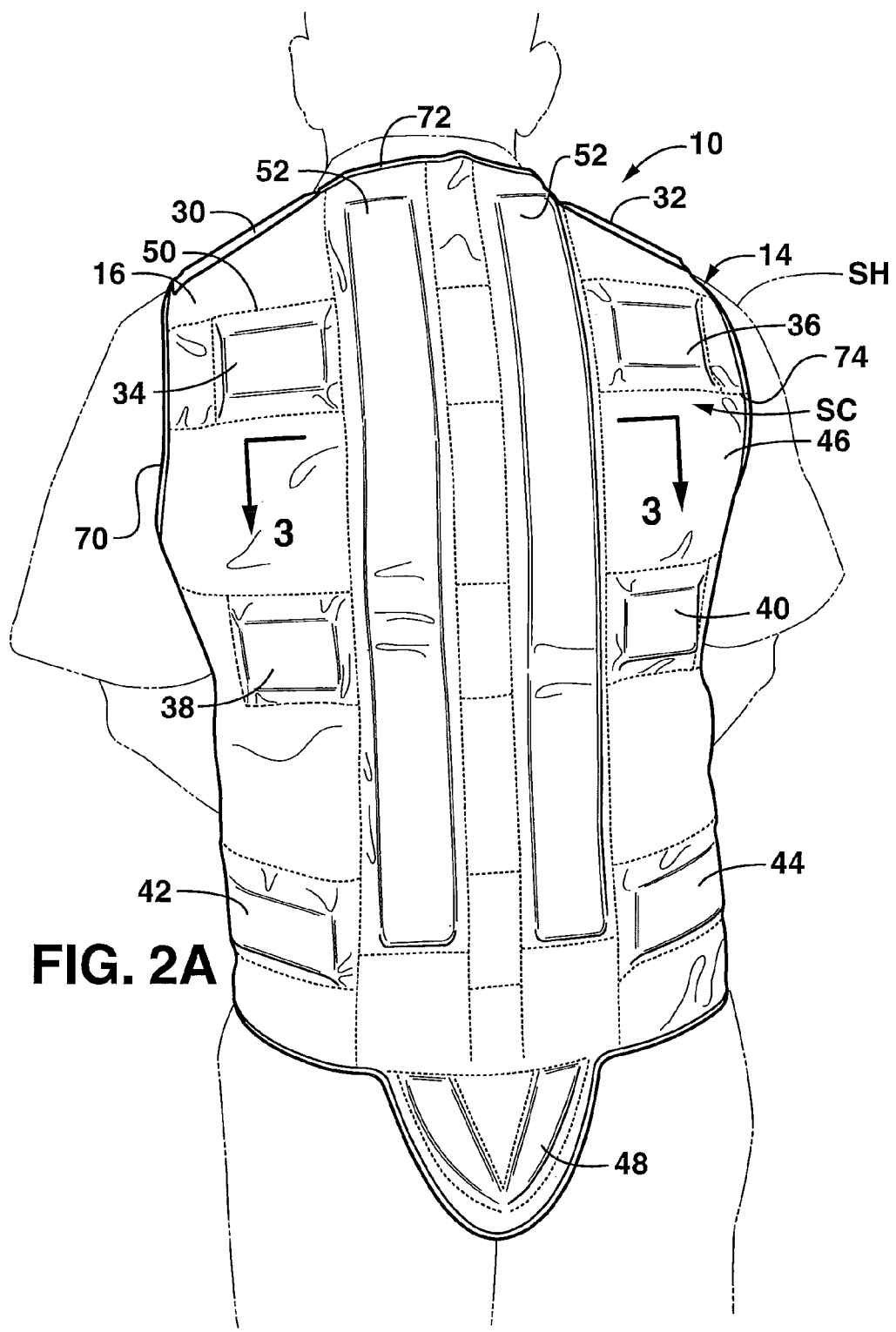
FIG. 2A is a perspective view of a biomechanical protective system from the rear constructed in accordance with the present invention.
Figure 2B:
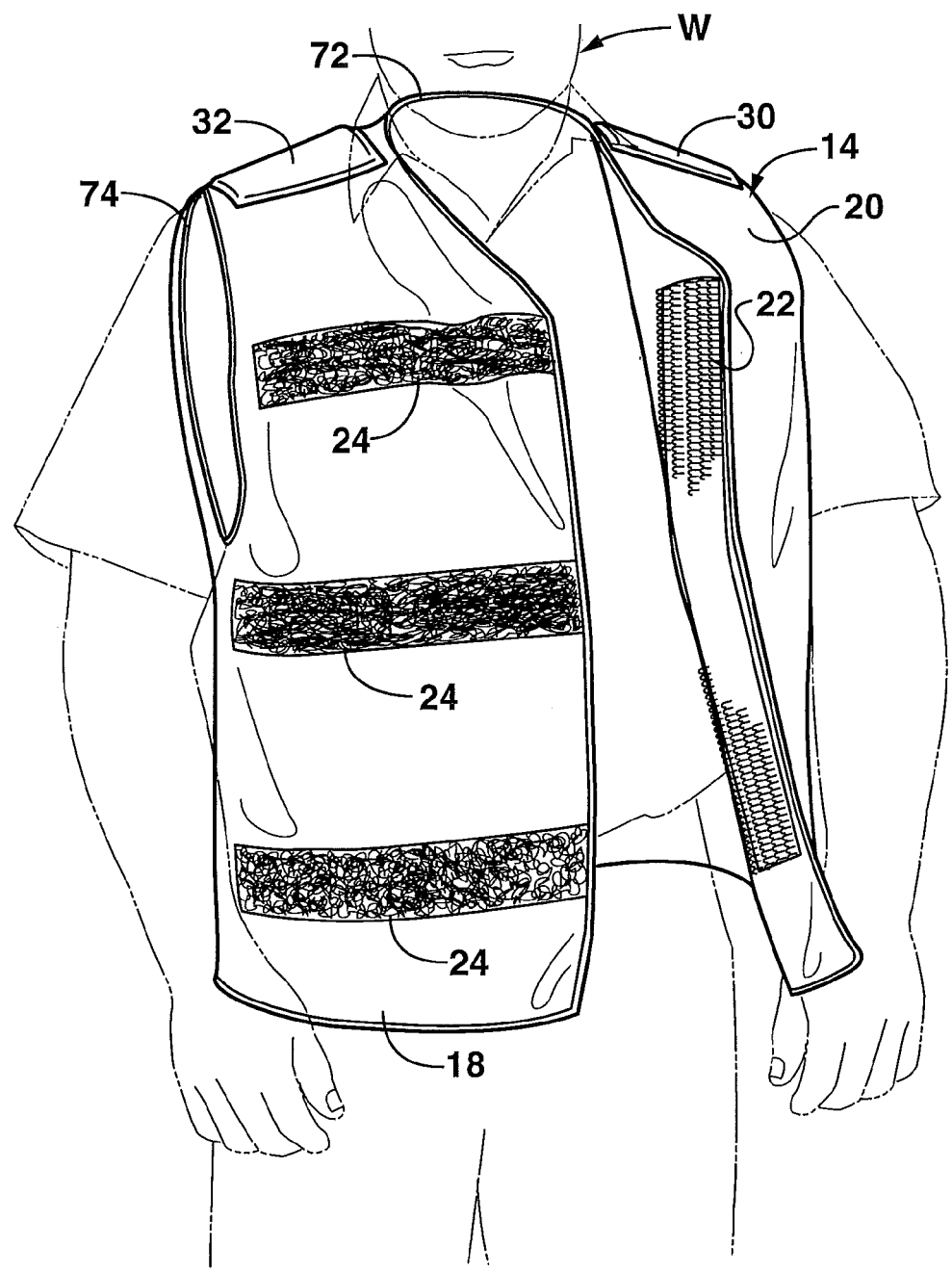
FIG. 2B is a perspective view of a biomechanical protective system from the front constructed in accordance with the present invention.

FIG. 2A illustrates one preferred embodiment of a biomechanical protective system 10 constructed in accordance with the present invention, and is, in one preferred embodiment, a vest, generally 14, having a body portion, generally 16. Body portion 16 has, as shown in FIG. 2B, two front portions 18, 20 which attach to one another through use of releasable fasteners, generally 22 and 24, such as Velcro®, or other hook and loop-type of fastening arrangements. For example, on front portion 20, a generally vertically disposed strip of hooks 22 is provided, and on front portion 18, a series of three, generally horizontally disposed strips of loop material 24 are provided. This arrangement of fasteners 22, 24 allows for vest 14 to snuggly fit about the wearer, generally W, and for allowing portions 18, 20 to be releasably fastened and unfastened quickly and easily.

Although fasteners 22, 24 for portions 18 and 20 are shown as hook and loop and/or Velcro® fasteners, it is to be understood that, although not shown, a variety of other releasable fasteners could be used, such as buttons, snaps, zippers, ties, twist fasteners, adhesives, magnets, clips, straps, buckles, etc., if desired. Body portion 16 of vest 14 could be made of a textile material, such as canvas, and/or could be woven, non-woven, or a combination of woven and non-woven materials. Further, body portion 16 could be plastic, leather, metallic mesh, flame retardant material, natural fibers, synthetic fibers, a blend thereof, or of any other suitable material.

Figure 2C:
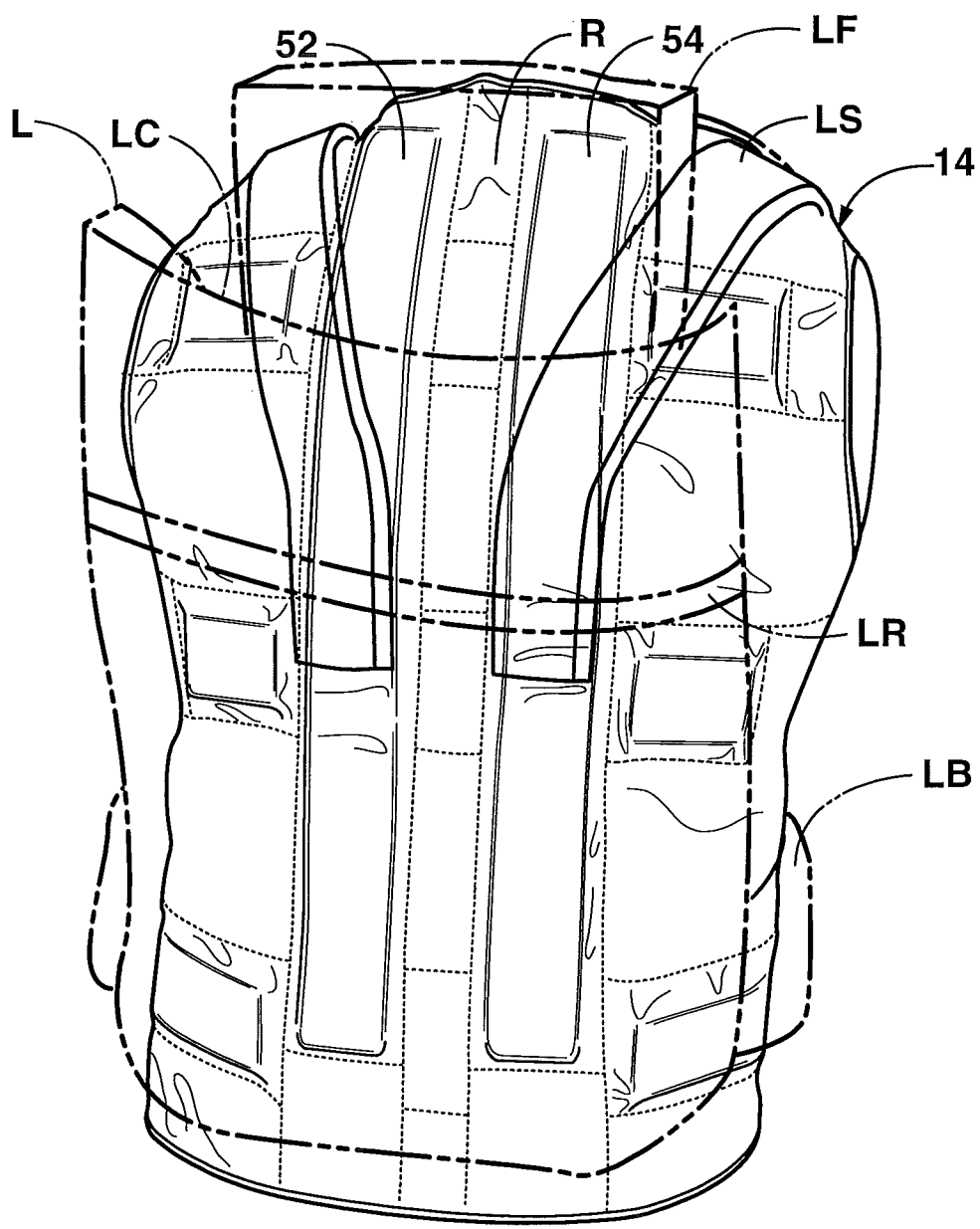
FIG. 2C is a perspective view of a biomechanical protective system constructed in accordance with the present invention used in connection with a load carrying structure carried on a person's back.

As shown in FIG. 2A, body portion 16 has a series of pads connected thereto for protecting various areas of the wearer's back. Shoulder area pads 30, 32 generally cover a portion of the wearer's shoulders SH during use of vest 14. Shoulder pads 30, 32 are preferably configured and oriented to being interposed between straps SS of the SCBA, in the context of a firefighter's use, and/or straps LS, as shown in FIG. 2C, of a load carrying structure, generally L, worn on a person's back. As used herein, "load carrying structure" can refer to the SCBA, and also to other structures, such as a child carrier, scuba tank, backpack, nick sack, book sack, equipment carrier, oxygen generator, etc., and protects the wearer's shoulders from forces exerted by an SCBA and/or other load carrying structure.

Load carrying structure L may include a compartment, generally LC, and a hip and/or waist strap or belt, generally LB, for wrapping about the wearer's waist and/or hips. Further, load carrying structure L may include a reflective strip, generally LR, for reflecting light in low light situations, if desired. Load carrying structure L may further include a rigid, semi-rigid, flexible, or other support structure, generally LF, which, as shown in the embodiment depicted in FIG. 2C, would preferably overlay para-spinal pads 52, 54 and bridge recess R therebetween.

Scapula area pads, generally 34, 36, are attached to body portion 16 and are on body portion 16 such that when worn, they are spaced from the person's spine of the scapula area, generally SC, such that a load carrying structure L worn by a person, such as a SCBA, or as otherwise identified above, is correspondingly spaced from the person's spine of the scapula to reduce and/or avoid altogether impingement by a load carrying structure thereon.

Positioned on or in body portion 16 generally below scapula area pads 34, 36 are lateral pads 38, 40 which protect the wearer's rib cage area from impingement of a load carrying structure and generally cover lateral portions of the wearer's back. Scapula pads 34, 36 are preferably configured to fit those areas of the back that are typically more thinly muscled as compared to the para-spinal musculature, generally PS, located along either side of spine S.

Kidney pads 42, 44 are provided body portion 16 and generally cover portions of the person's back proximate the kidney areas to protect those areas from impingement of the load carrying structure. Kidney pads 42, 44 are positioned on vest to be separated from the kidneys and work in conjunction with lateral pads 38, 40 to space the load carrying structure away from impinging on the person's kidneys. Alternately, the kidney pads could, if made broad enough, cover the kidney area and safely distribute forces from the load carrying structure about the kidney area.

Extending downwardly from the back portion, generally 46, of body portion 16 is a sacrum pad 48, which generally covers a portion of the wearer's sacrum area, again, protecting such area from forces of a load carrying structure L worn and/or carried by wearer W. Although sacrum pad 48 is shown in one piece, it could, alternately, be in multiple portions, if necessary, depending on the particular application of system 10.

Para-spinal pads 52, 54 are connected to body portion 16 and are laterally spaced form and extend substantially the length of the wearer's spine and overlay and/or cover a portion of the wearer's para-spinal musculature PS. Para-spinal pads 52, 54 are preferably of a thickness such that a recess, generally R, is created between pads 52 and 54. Recess R allows generally free movement of the wearer's spinous processes SP with little or no impingement of these spinous processes on the load carrying structure being worn by the person.

Figure 3A:
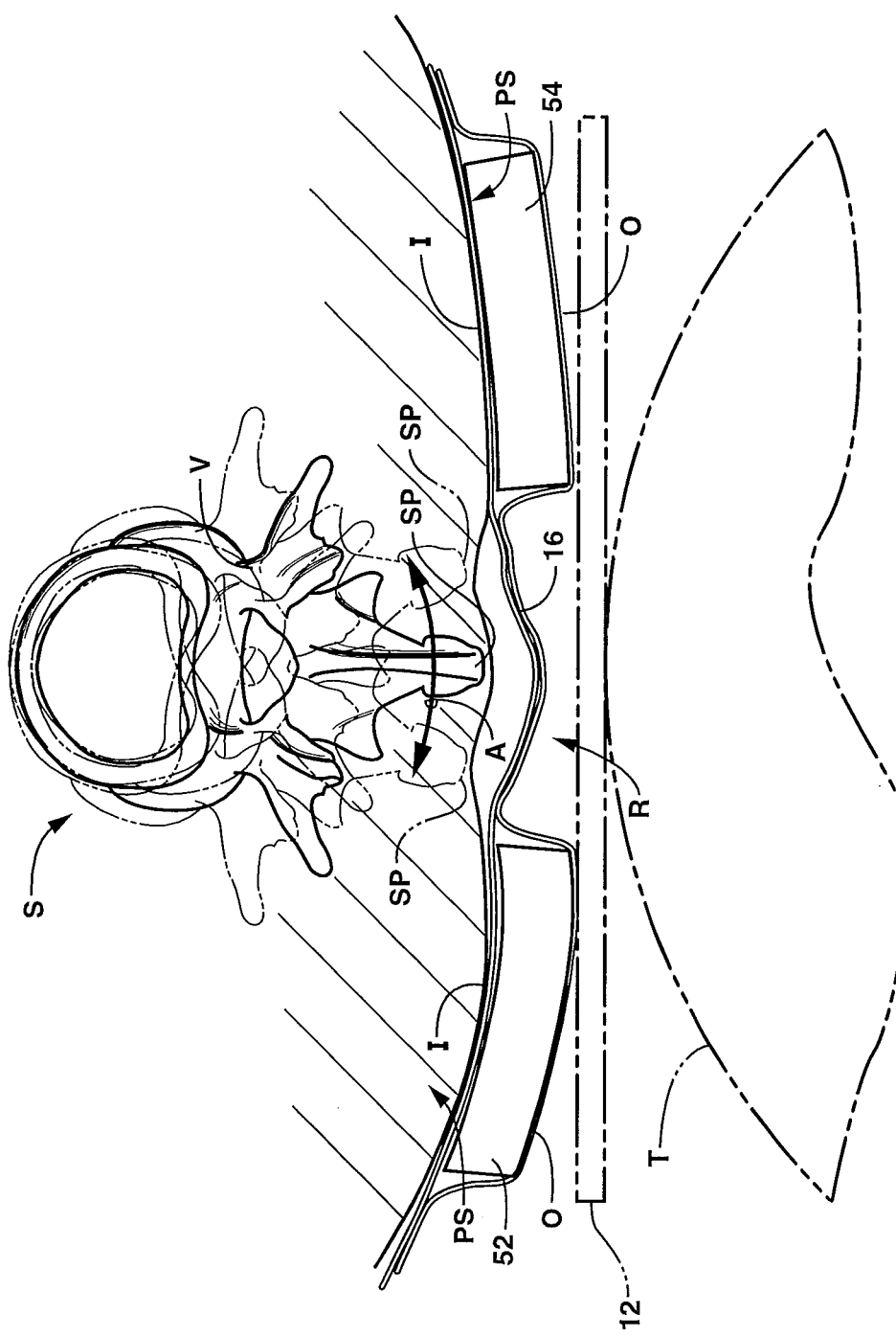
FIG. 3A is a sectional view taken along lines 3-3 of FIG. 2A when the wearer of the biomechanical protective system is standing.
Figure 3B:
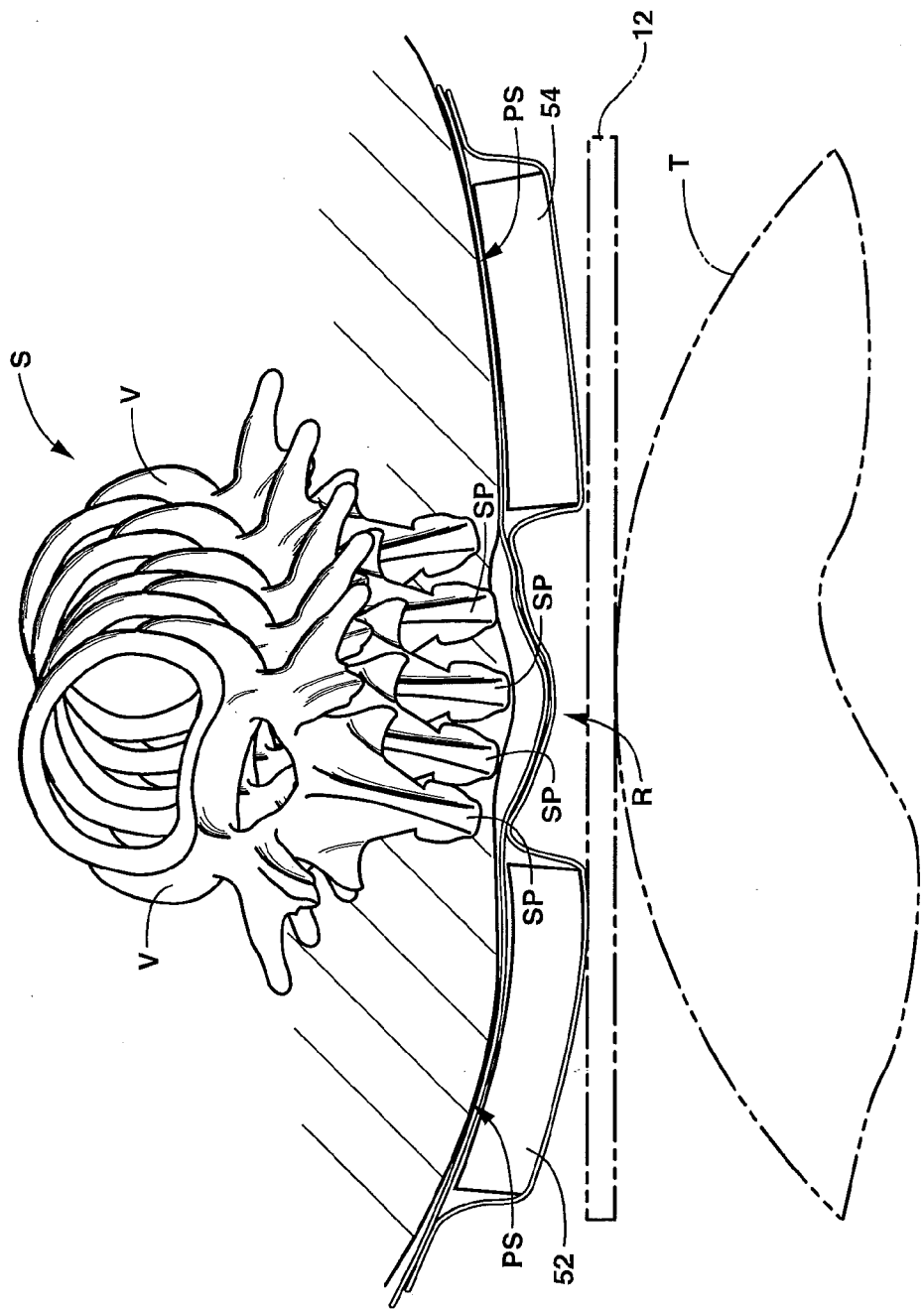
FIG. 3B is a section view taken along lines 3-3 of FIG. 2A when the wearer of the biomechanical protective system is twisted.
Figure 8:
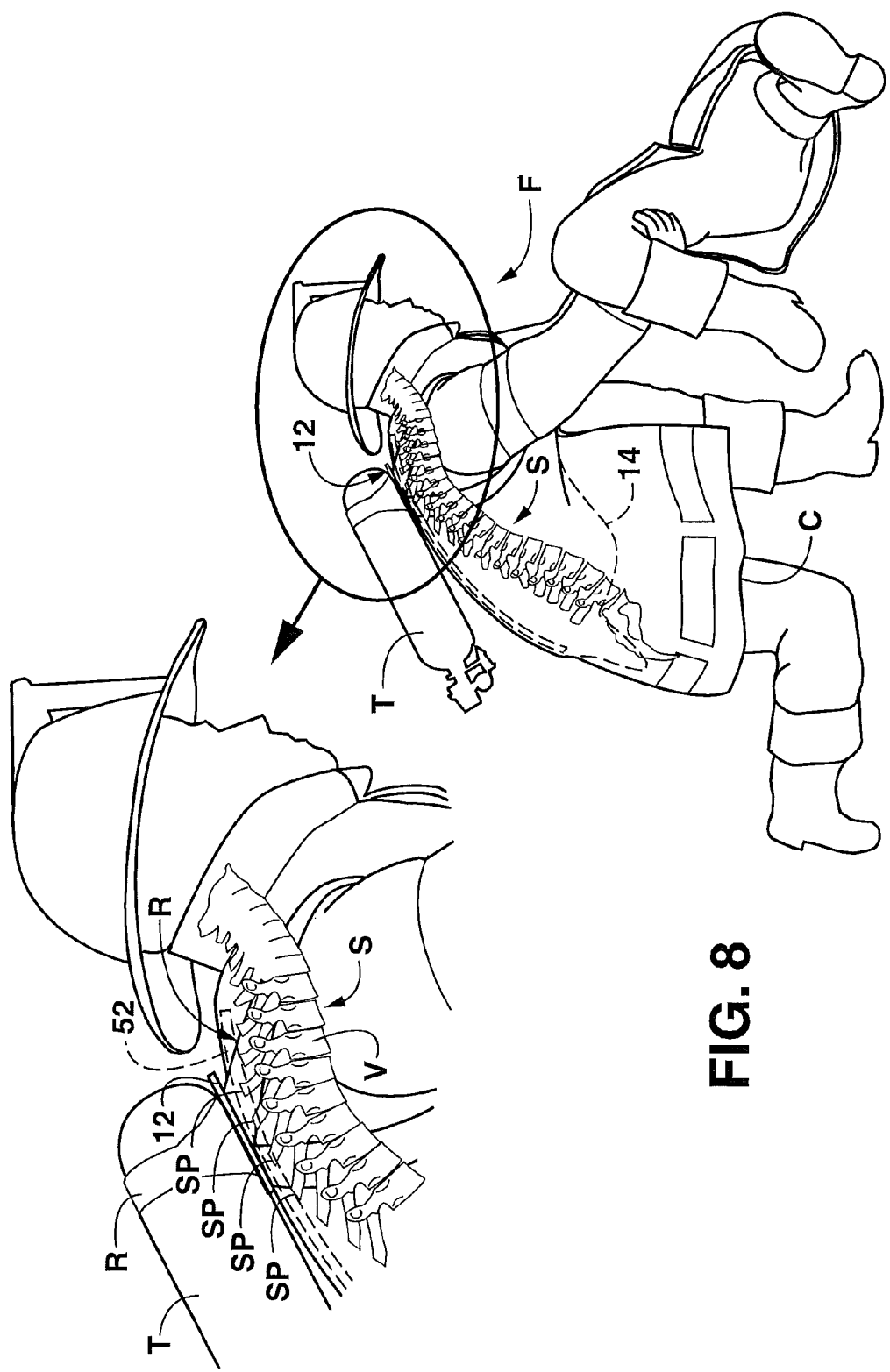
FIG. 8 is a perspective view of a firefighter wearing a biomechanical protective system constructed in accordance with the present invention when bending over.

As shown in FIGS. 3A and 3B, recess R provides clearance of spinous processes SP when a user is standing and/or when the user twists from side to side as shown by arrow A. Since vest 14 is worn snuggly by the wearer, the orientation of pads 52, 54 and recess R with respect to spine S, vertebra V, and spinous processes SP is maintained generally throughout the range of motions of wearer W. For example, as shown in FIG. 3B, when the wearer performs movement including twisting and bending, pads 52, 54 remain positioned over the wearer's para-spinal musculature PS, and recess R is substantially over the wearer's spine. Also, as shown in FIGS. 5 and 8, when a firefighter crawls on his or her hands and knees while maintaining a hand on a wall to maintain orientation, for example in a smoke filled room, pads 52, 54 remain positioned over the firefighter's para-spinal musculature, and recess R is substantially maintained over the spine of the firefighter. Recess R thus allows movement of spinous processes SP with little or no impingement thereon by a rigid structure such as frame portion 12 of a load carrying structure.

Preferably, vest 14 is fastened about wearer W in a snug, form-fitting configuration such that when the wearer stands, bends, crawls, twists, etc., vest 14 stays properly oriented with respect to the wearer's torso and upper body, thereby keeping pads 30, 32, 34, 36, 38, 40, 42, 44, 48, 50, and 52 in proper alignment with respect to the user's shoulders, spine of scapula, para-spinal musculature, lateral back portions, kidney area portions, and sacrum of the wearer during use of system 10. Thus, vest 14 can be worn by firefighter F, in one preferred embodiment, beneath flame retardant coat C and provide constant protection to firefighter F from impingement of an SCBA, even though the protective coat C and/or the SCBA may move relative to vest 14.

Pads 30, 32, 34, 36, 38, 40, 42, 44, and 48 can be held in place with respect to body portion 16 by sewn seams, generally 50, or through some other means, such as adhesive, thermal bonding, ultra sonic welding, or through any other suitable method. Such pads are preferably high density, semi-compressible foam, although other padding arrangements could be used, such as gel-filled compartments, air filled compartments, fluid filled compartments, woven and/or non-woven materials, felt, springs or other resilient devices, etc., if desired.

Figure 4A:
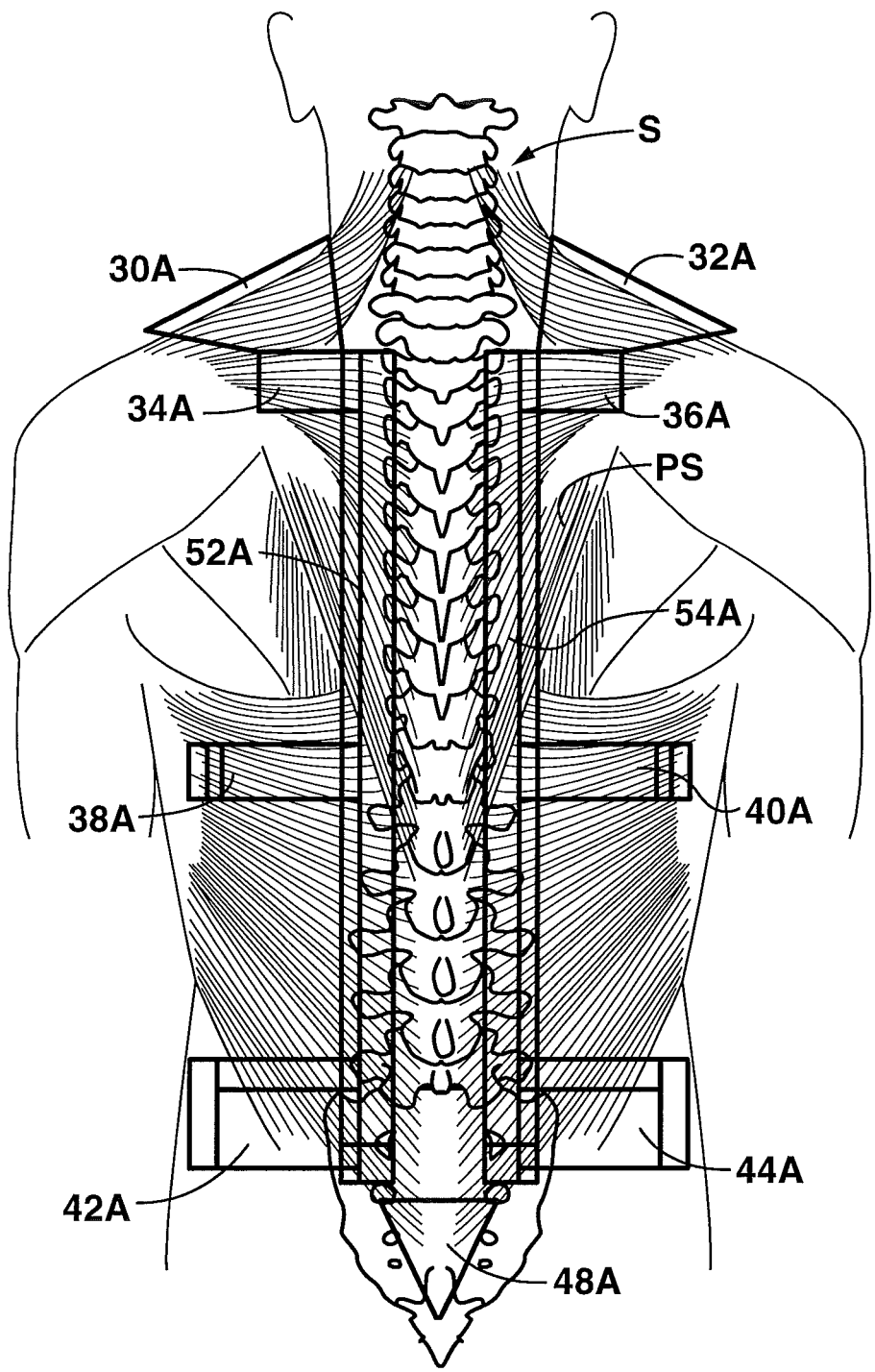
FIG. 4A is a schematic representation of padding arrangement of one preferred embodiment of a biomechanical protective system constructed in accordance with the present invention.

FIGS. 4A through 4F illustrate various alternate embodiment arrangements of padding usable in a biomechanical protective system constructed in accordance with the present invention. In FIG. 4A, for example, alternate embodiment shoulder pads 30A, 32A are shown as are alternate embodiment scapula area pads 34A, 36A, lateral pads 38A, 40A, kidney pads 42A, 44A, sacrum pad 48A, and para-spinal pads 52A and 54A.

Figure 4B:
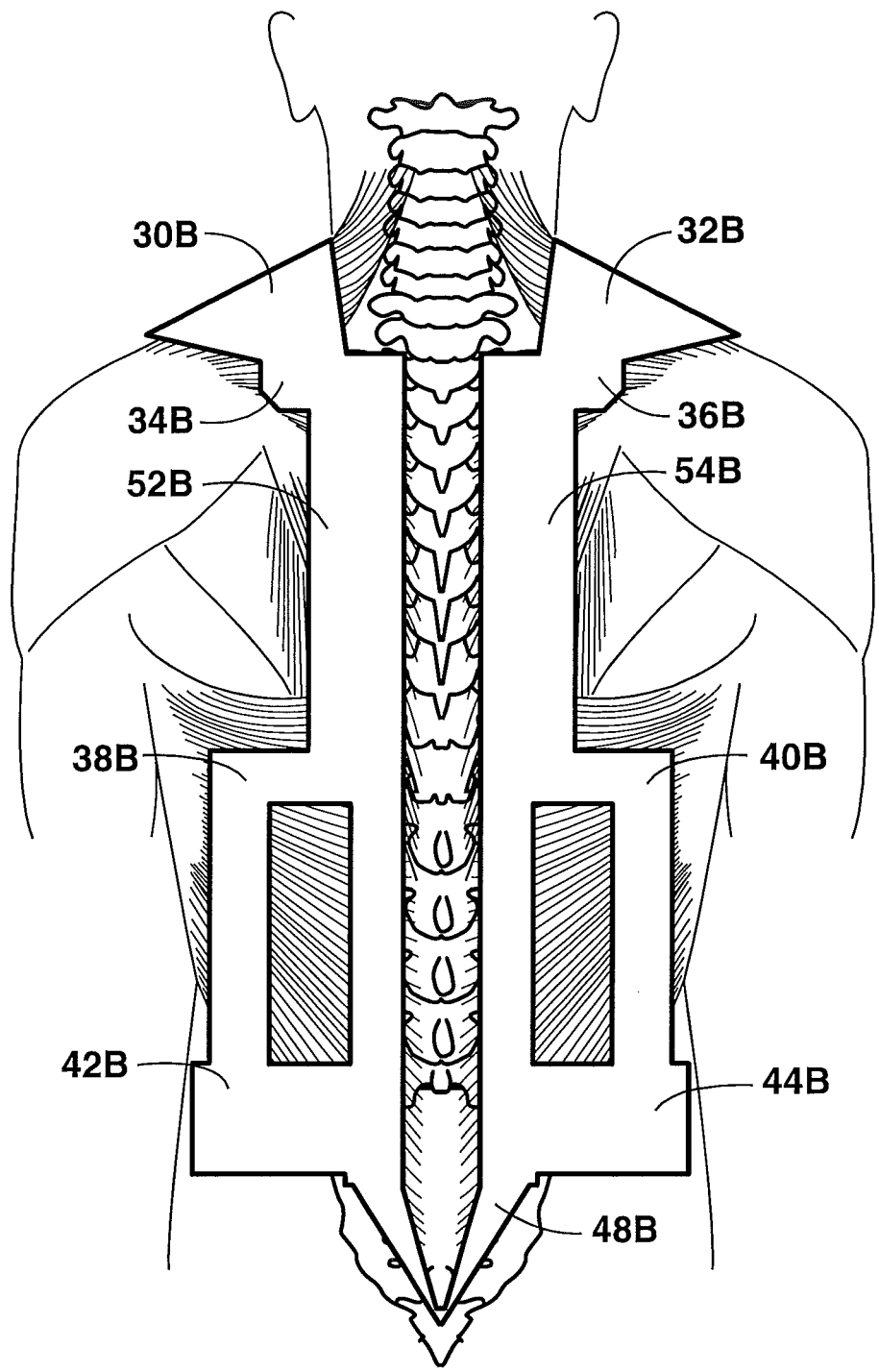
FIG. 4B is a schematic representation of padding arrangement of a first alternate embodiment of a biomechanical protective system constructed in accordance with the present invention.

In FIG. 4B, alternate embodiment shoulder pads 30B, 32B are shown as are alternate embodiment scapula area pads 34B, 36B, lateral pads 38B, 40B, kidney pads 42B, 44B, sacrum pad 48B, and para-spinal pads 52B and 54B.

Figure 4C:
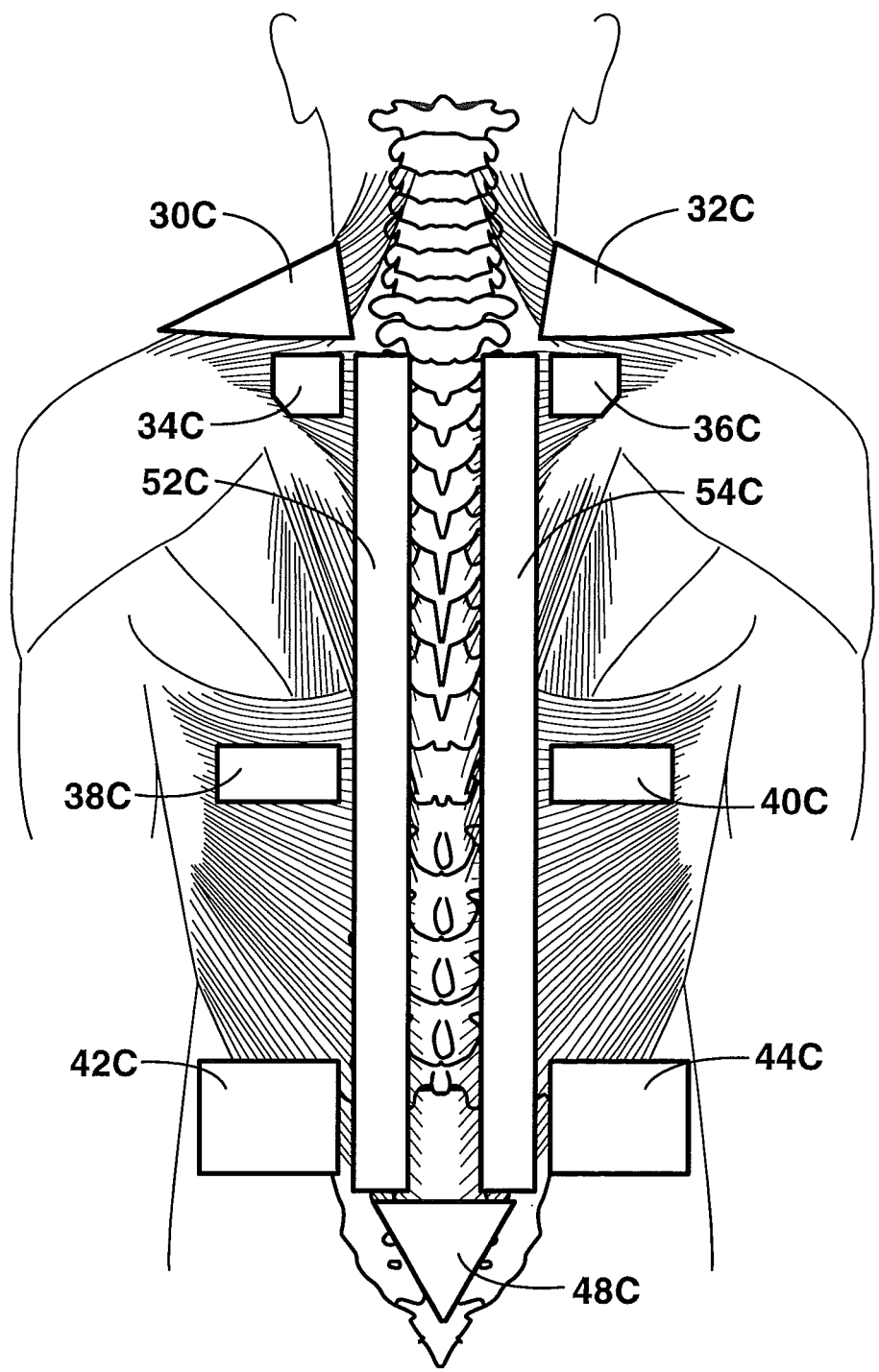
FIG. 4C is a schematic representation of padding arrangement of a second alternate embodiment of a biomechanical protective system constructed in accordance with the present invention.

In FIG. 4C, alternate embodiment shoulder pads 30C, 32C are shown as are alternate embodiment scapula area pads 34C, 36C, lateral pads 38C, 40C, kidney pads 42C, 44C, sacrum pad 48C, and para-spinal pads 52C and 54C.

Figure 4D:
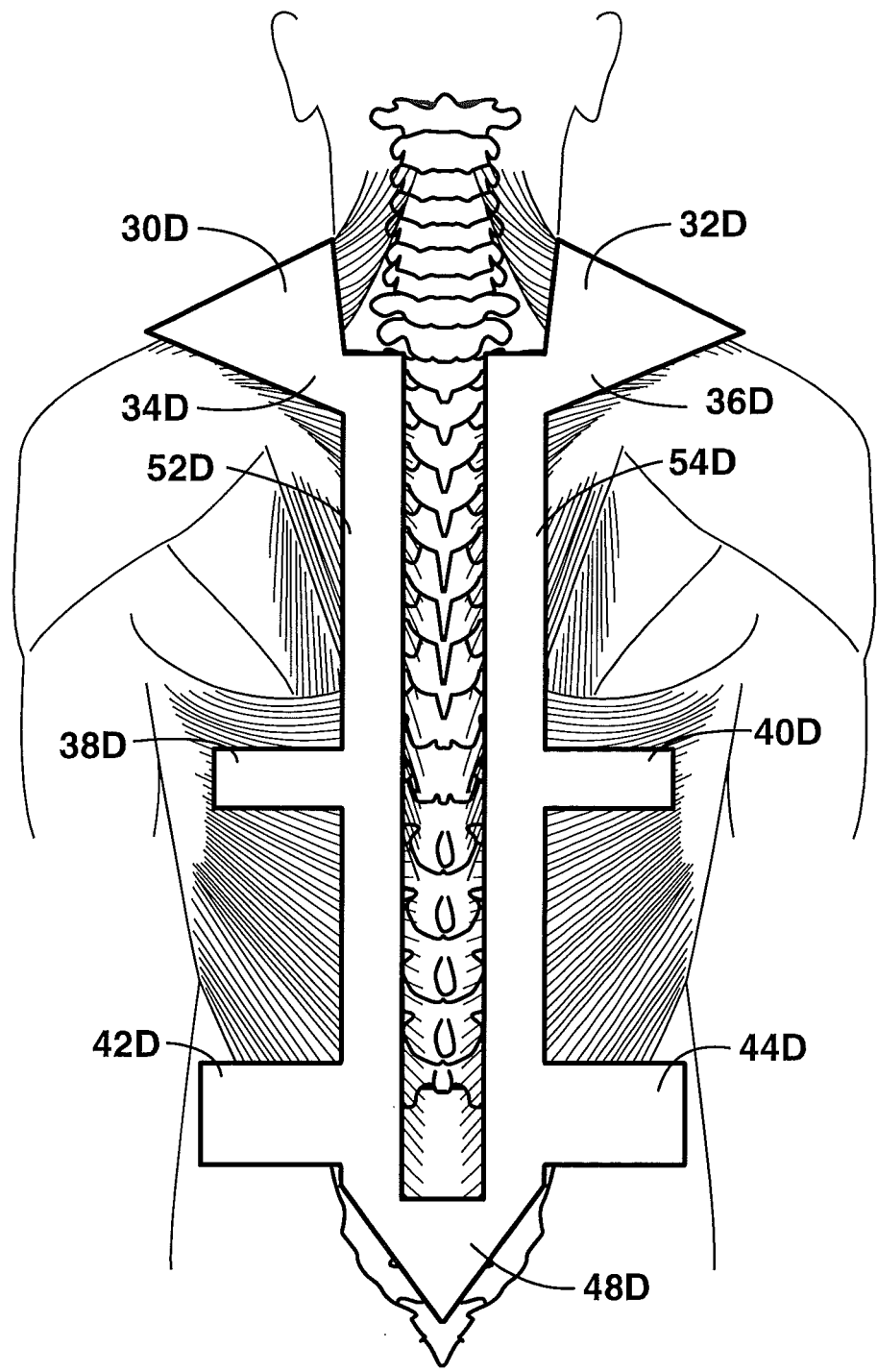
FIG. 4D is a schematic representation of padding arrangement of a third alternate embodiment of a biomechanical protective system constructed in accordance with the present invention.

In FIG. 4D, alternate embodiment shoulder pads 30D, 32D are shown as are alternate embodiment scapula area pads 34D, 36D, lateral pads 38D, 40D, kidney pads 42D, 44D, sacrum pad 48D, and para-spinal pads 52D and 54D.

Figure 4E:
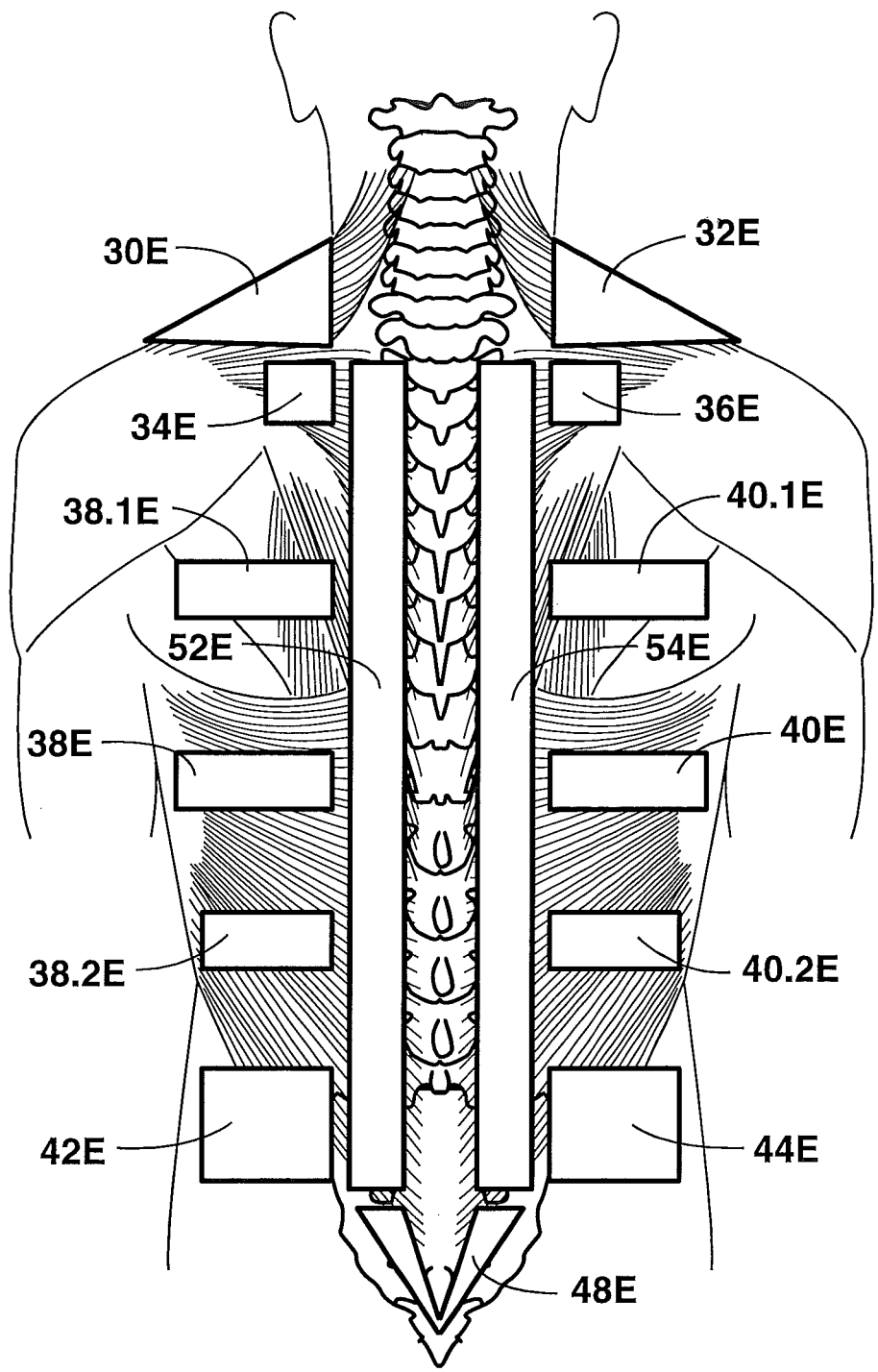
FIG. 4E is a schematic representation of padding arrangement of a fourth alternate embodiment of a biomechanical protective system constructed in accordance with the present invention.

In FIG. 4E, alternate embodiment shoulder pads 30E, 32E are shown as are alternate embodiment scapula area pads 34E, 36E, lateral pads 38E, 38.1E, 38.2E, 40E, 40.1E, 40.2E, kidney pads 42E, 44E, sacrum pad 48E, and para-spinal pads 52E and 54E.

Figure 4F:
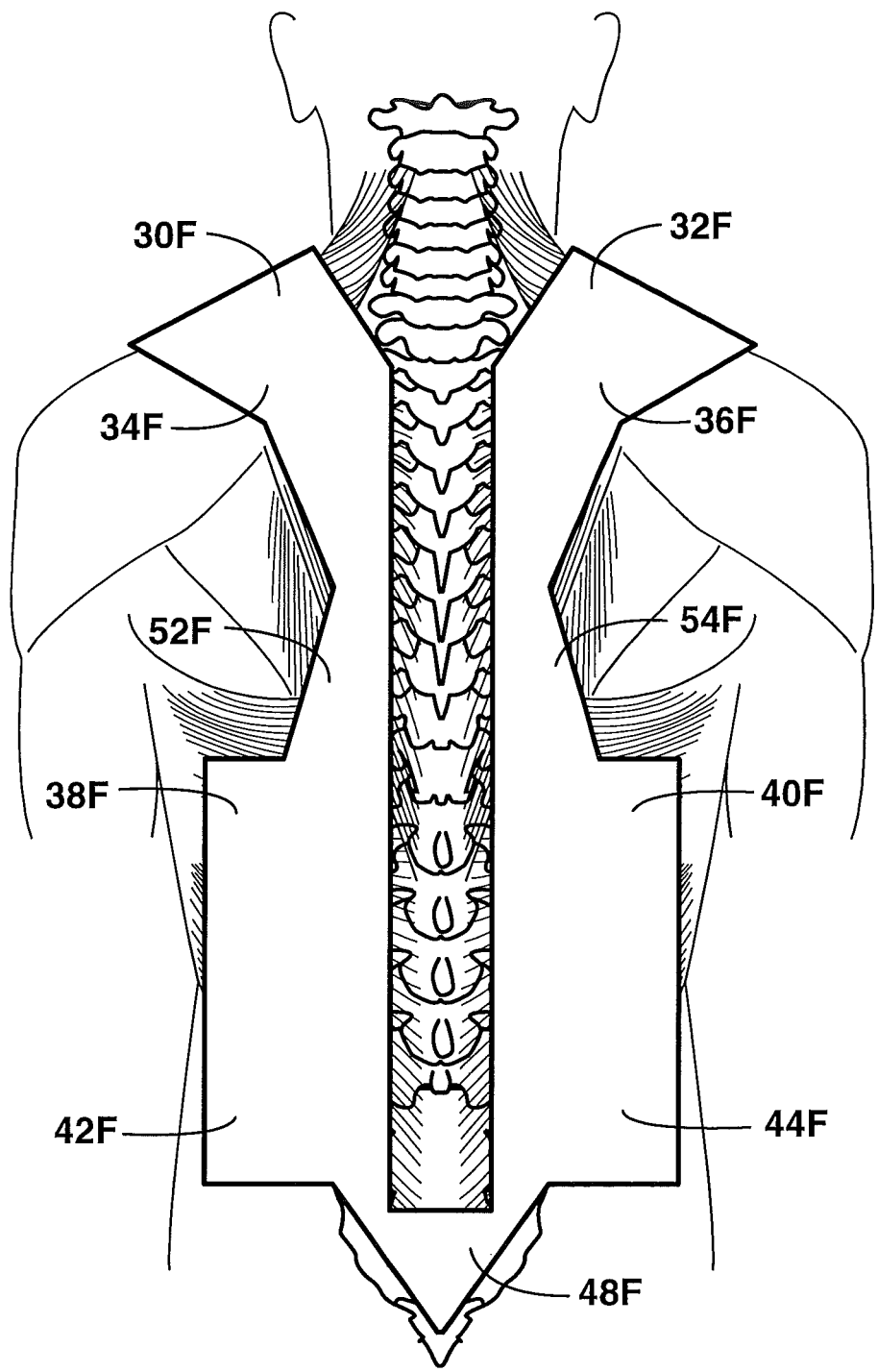
FIG. 4F is a schematic representation of padding arrangement of a fifth alternate embodiment of a biomechanical protective system constructed in accordance with the present invention.

In FIG. 4F, alternate embodiment shoulder pads 30F, 32F are shown as are alternate embodiment scapula area pads 34F, 36F, lateral pads 38F, 40F, kidney area pads 42F, 44F, sacrum pad 48F, and para-spinal pads 52F and 54F. In this embodiment, kidney area pads 42F, 44F may actually cover the person's kidneys, but such pads may be configured to distribute external forces applied to the pads safely about the kidneys.

As shown in FIG. 2, vest 14 may also include light reflecting strips 70, 72 and 74 which could be of reflective and/or retro-reflective material in order to assist spotting of the wearer in low light situations.

Figure 6:
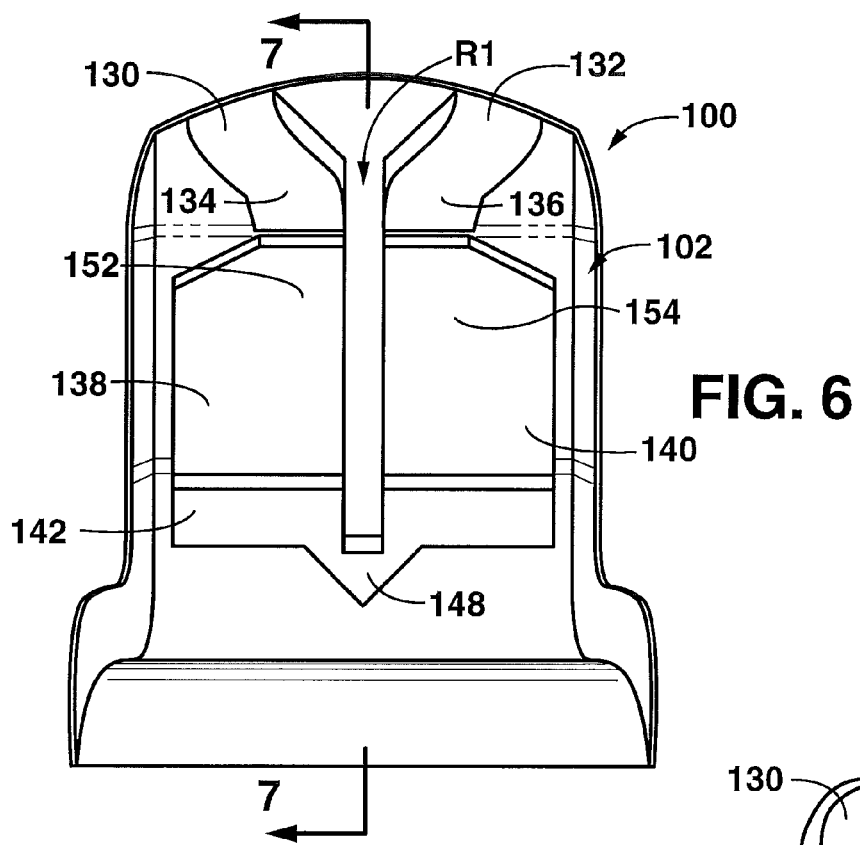
FIG. 6 is a front elevational view of a seat incorporating a biomechanical protective system constructed in accordance with the present invention.
Figure 7:
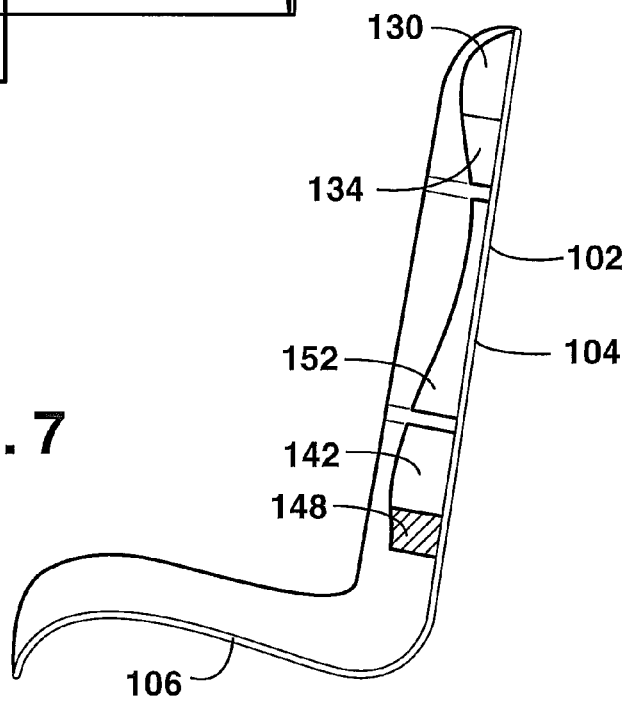
FIG. 7 is a sectional view taken along lines 7-7 of FIG. 6.

Turning to FIGS. 6 and 7, the biomechanical protective system of the present invention is illustrated as applied to a seat, generally 100. Seat 100 could be used in ordinary chairs found in the home, office, commercial settings, and the like, and/or in vehicles, particularly those which experience acceleration and/or vibration forces, such as an aircraft, race cars, boats, space vehicles, amusement rides, automobiles, trucks, industrial equipment, etc. Seat 100 includes shoulder area pads 130, 132 attached to a rigid or generally rigid seat structure, generally 102, which includes a back portion 104 and a bottom portion 106. Pads 130, 132 have integral therewith scapula area padding 134 and 136, which are configured to be spaced from a person's spine of the scapula area and to contact a portion of the person's back generally adjacent the spine of the scapula area when the person is seated in seat 100.

Seat 100 also includes para-spinal padding 152 and 154 spaced from and extending substantially the length of the seated person's spine and contacting and/or covering a portion of the para-spinal musculature of the person. Padding 152, 154 is of a contour and or thickness such that the rearward most extension of the spinous processes SP of the person's spine are spaced from back portion 104 of support structure 102. Padding 152, 154 defines a recess, generally R1, to allow spinous processes SP to be separated from direct impingement with back portion 104 and/or support structure 102.

Kidney area padding 142 and 144 is provided, as is also sacrum padding 148 for protecting the kidneys and sacrum area, respectively of the person.

Padding 130, 132, 134, 136, 138, 140, 142, 144, 148, 152, and 154 could be of generally uniform thickness, or could be, as shown in FIG. 7, contoured to the natural contour of the person's back to provide more comfort and/or protection, if desired.

It is to be understood that the present invention is not limited to the specific padding structures illustrated in FIGS. 6 and 7 for seat 100, and that various other configurations of such padding could be provided, if desired, without departing from the teaching of the present invention as discussed herein. Furthermore, the padding arrangements of vest 14 and/or the padding arrangements illustrated in FIGS. 4A through 4F could be applied to seat 100, if desired, for providing biomechanical protection to the body.

Vest 14 could also be used when the wearer is in a seated position, particularly when seated in a vehicle experiencing unusually large acceleration and/or G-forces and could be used, for example, by pilots seated in aircraft ejection seats.

The biomechanical protection system 10 could also be used in connection with protective clothing items, apart from back-carried loads and/or seating applications. For example, motorcycle jackets could have the padding arrangements discussed herein, or variations thereof, to protect the motorcyclist's spine, back, spine of the scapula, kidneys, etc., in the event the motorcyclist is involved in an accident and/or thrown from the motorcycle. System 10 could also be used in a vest arrangement, hospital garment arrangement, or the like in medical applications to protect a patient's spine, back, shoulders, spine of the scapula, kidneys, etc. before and/or after surgery or other medical procedures.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A seat adapted to receive a person and that is adapted to press upon the tissue of the person's back in the vicinity of the spinous processes and transverse processes of the vertebrae of the person's spine, the seat comprising:
    a body portion adapted to be under pressure from the person and to encompass a substantial portion of the person's back;
    at least one para-spinal pad connected to said body portion;
    said at least one para-spinal pad defining at least one first pad portion adapted to permit transfer of pressure from said transverse processes of the person's vertebrae generally directly through the tissue of the person's back to said body portion;
    said at least one para-spinal pad defining a recess adapted to be centered about the person's spinous processes along substantially the length of the person's spine;
    said recess being of a width adapted to be less than the width of the transverse processes of the person's vertebrae and greater than the width of the person's spinous processes;
    at least one scapula area pad connected to said body portion;
    said at least one scapula area pad adapted to be spaced from the person's spine of the scapula area and covering a portion of the person's back generally adjacent the spine of the scapula area;
    at least one lateral pad connected to said body portion adapted to generally cover a lateral portion of the person's back; and
    said at least one scapula area pad, para-spinal pad, and lateral pad working in conjunction with each other and adapted to partially or completely encircle the spine of the scapula area of a person to space the spine of the scapula of a person from the body portion, and as a consequence provide a gap of free space for providing substantially unimpeded biomechanical movement of the spine of the scapula of the person.

2. The seat as defined in claim 1, further comprising:
at least one kidney area pad connected to said body portion adapted to generally cover a portion of the person's back generally adjacent the kidney area of the person's back; and
said at least one lateral pad, para-spinal pad, and kidney area pad working in conjunction with each other and adapted to partially or completely encircle the kidney area of the person to space the body portion from the kidney area, and as a consequence provide a gap of free space over an intended degree of the kidney area of the person's back.

3. The seat as defined in claim 1, further comprising a sacrum pad connected to said body portion adapted to generally cover a portion of a sacrum area of the person.

4. The seat as defined in claim 1, further comprising said body portion being generally rigid.

5. The seat as defined in claim 1, further comprising at least one shoulder area pad connected to said body portion adapted to generally cover a portion of the person's shoulder area.

6. The seat as defined in claim 1, further comprising:
a sacrum pad connected to said body portion adapted to generally cover a portion of a sacrum area of the person;
at least one kidney area pad connected to said body portion adapted to generally cover a portion of the person's back generally adjacent the kidney area of the person's back; and
said at least one lateral pad, para-spinal pad, and kidney area pad working in conjunction with each other and adapted to partially or completely encircle the kidney area of the person to space the body portion from the kidney area, and as a consequence provide a gap of free space over an intended degree of the kidney area of the person's back.

7. The seat as defined in claim 1, further comprising:
said body portion being generally rigid;
at least one kidney area pad connected to said body portion adapted to generally cover a portion of the person's back generally adjacent the kidney area of the person's back; and
said at least one lateral pad, para-spinal pad, and kidney area pad working in conjunction with each other and adapted to partially or completely encircle the kidney area of the person to space the body portion from the kidney area, and as a consequence provide a gap of free space over an intended degree of the kidney area of the person's back.

8. The seat as defined in claim 1, further comprising:
at least one shoulder area pad connected to said body portion adapted to generally cover a portion of the person's shoulder area;
at least one kidney area pad connected to said body portion adapted to generally cover a portion of the person's back generally adjacent the kidney area of the person's back; and
said at least one lateral pad, para-spinal pad, and kidney area pad working in conjunction with each other and adapted to partially or completely encircle the kidney area of the person to space the body portion from the kidney area, and as a consequence provide a gap of free space over an intended degree of the kidney area of the person's back.

9. The seat as defined in claim 1, further comprising:
a sacrum pad connected to said body portion adapted to generally cover a portion of a sacrum area of the person;
said body portion being generally rigid;
at least one shoulder area pad connected to said body portion adapted to generally cover a portion of the person's shoulder area;
at least one kidney area pad connected to said body portion adapted to generally cover a portion of the person's back generally adjacent the kidney area of the person's back; and
said at least one lateral pad, para-spinal pad, and kidney area pad working in conjunction with each other and adapted to partially or completely encircle the kidney area of the person to space the body portion from the kidney area, and as a consequence provide a gap of free space over an intended degree of the kidney area of the person's back.

10. The seat as defined in claim 1, further comprising:
a sacrum pad connected to said body portion adapted to generally cover a portion of a sacrum area of the person; and
at least one shoulder area pad connected to said body portion adapted to generally cover a portion of the person's shoulder area.

11. The seat as defined in claim 1, further comprising:
a sacrum pad connected to said body portion adapted to generally cover a portion of a sacrum area of the person; and
said body portion being generally rigid.

12. The seat as defined in claim 1, further comprising:
at least one shoulder area pad connected to said body portion adapted to generally cover a portion of the person's shoulder area; and
said body portion being generally rigid.

13. The seat as defined in claim 1, further comprising:
said body portion being generally rigid;
a sacrum pad connected to said body portion adapted to generally cover a portion of a sacrum area of the person;
at least one shoulder area pad connected to said body portion adapted to generally cover a portion of the person's shoulder area;
at least one kidney area pad connected to said body portion adapted to generally cover a portion of the person's back generally adjacent the kidney area of the person's back; and
said at least one lateral pad, para-spinal pad, and kidney area pad working in conjunction with each other and adapted to partially or completely encircle the kidney area of the person to space the body portion from the kidney area, and as a consequence provide a gap of free space over an intended degree of the kidney area of the person's back.

14. A seat adapted to receive a person and that is adapted to press upon the tissue of the person's back in the vicinity of the spinous processes and transverse processes of the vertebrae of the person's spine, the seat comprising:
a substantially rigid body portion adapted to be under pressure from said person and adapted to encompass a substantial portion of the person's back;
at least one pad connected to said body portion;
at least one para-spinal pad defining at least one first pad portion adapted to permit transfer of pressure from said transverse processes of the person's vertebra generally directly through the tissue of the person's back to said body portion;
said at least one para-spinal pad defining a recess of a width adapted to be less than the width of the transverse processes of the person's vertebrae adapted and greater than the width of the person's spinous processes to substantially avert said pressure from being transmitted from the person's spinous processes to said body portion;

at least one scapula area pad connected to said body portion;

said at least one scapula area pad adapted to be spaced from the person's spine of the scapula area and adapted to cover a portion of the person's back generally adjacent the spine of the scapula area;

at least one lateral pad connected to said body portion adapted to generally cover a lateral portion of the person's back;

said at least one scapula area pad, para-spinal pad, and lateral pad working in conjunction with each other and adapted to partially or completely encircle the spine of the scapula area of a person to space the spine of the scapula of a person from the body portion, and as a consequence provide a gap of free space for providing substantially unimpeded biomechanical movement of the spine of the scapula of the person;

at least one kidney area pad connected to said body portion adapted to generally cover a portion of the person's back generally adjacent the kidney area of the person's back; and said at least one lateral pad, para-spinal pad, and kidney area pad working in conjunction with each other and adapted to partially or completely encircle the kidney area of the person to space the body portion from the kidney area, and as a consequence provide a gap of free space over an intended degree of the kidney area of the person's back.

15. The seat as defined in claim 14, further comprising a sacrum pad connected to said body portion adapted to generally cover a portion of a sacrum area of the person.

16. A seat adapted to receive a person and that is adapted to press upon the tissue of a person's back in the vicinity of the spinous processes and transverse processes of the vertebrae of the person's spine, the seat comprising:

a body portion adapted to be under pressure from said person and adapted to encompass a substantial portion of the person's back;

at least one para-spinal pad connected to said body portion;

said at least one para-spinal pad defining at least one first pad portion adapted to permit transfer of pressure from said transverse processes of the person's vertebrae in approximately the C-7 to T-5 range of the person's spine generally directly through the tissue of the person's back to the body portion;

said at least one para-spinal pad defining a recess of a width adapted to be less than the width of the transverse processes of the person's vertebrae and greater than the width of the person's spinous processes and adapted to substantially avert pressure from being transmitted from substantially all of the person's spinous processes in approximately the C-7 to T-5 range of the person's spine to the body portion;

at least one scapula area pad connected to said body portion;

said at least one scapula area pad being spaced from the person's spine of the scapula area and adapted to cover a portion of the person's back generally adjacent the spine of the scapula area;

at least one lateral pad connected to said body portion adapted to generally cover a lateral portion of the person's back;

said at least one scapula area pad, para-spinal pad, and lateral pad working in conjunction with each other and adapted to partially or completely encircle the spine of the scapula area of a person to space the spine of the scapula of a person from the body portion, and as a consequence provide a gap of free space for providing substantially unimpeded biomechanical movement of the spine of the scapula of the person;

at least one kidney area pad connected to said body portion adapted to generally cover a portion of the person's back generally adjacent the kidney area of the person's back; and said at least one lateral pad, para-spinal pad, and kidney area pad working in conjunction with each other and adapted to partially or completely encircle the kidney area of the person to space the body portion from the kidney area, and as a consequence provide a gap of free space over an intended degree of the kidney area of the person's back.

17. The seat as defined in claim 16, further comprising a sacrum pad connected to said body portion adapted to generally cover a portion of a sacrum area of the person.

18. The seat as defined in claim 16, further comprising said body portion being generally rigid.

19. The seat as defined in claim 16, further comprising at least one shoulder area pad connected to said body portion adapted to generally cover a portion of the person's shoulder area.

* * * * *